US012431618B2

(12) United States Patent
Makurin et al.

(10) Patent No.: US 12,431,618 B2
(45) Date of Patent: Sep. 30, 2025

(54) WIDE SCANNING PATCH ANTENNA ARRAY

(71) Applicant: Samsung Electronics Co., Ltd., Suwon-si (KR)

(72) Inventors: Mikhail Nikolaevich Makurin, Moscow (RU); Elena Aleksandrovna Shepeleva, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/986,448

(22) Filed: Nov. 14, 2022

(65) Prior Publication Data

US 2023/0155284 A1 May 18, 2023

Related U.S. Application Data

(63) Continuation of application No. PCT/KR2022/017722, filed on Nov. 11, 2022.

(30) Foreign Application Priority Data

Nov. 12, 2021 (RU) ........................... RU2021132942

(51) Int. Cl.
*H01Q 3/24* (2006.01)
*H01Q 21/06* (2006.01)

(52) U.S. Cl.
CPC ........... *H01Q 3/247* (2013.01); *H01Q 21/065* (2013.01)

(58) Field of Classification Search
CPC ............................ H01Q 3/247; H01Q 21/065
See application file for complete search history.

(56) References Cited

U.S. PATENT DOCUMENTS 6,211,824 B1 4/2001 Holden et al.
10,333,228 B2 * 6/2019 Watson .................. H01Q 21/28
(Continued)

FOREIGN PATENT DOCUMENTS

CN 101931122 A 12/2010
CN 206098713 U 4/2017
(Continued)

OTHER PUBLICATIONS

International Search Report with Written Opinion dated Feb. 22, 2023; International Appln. No. PCT/KR2022/017722.
(Continued)

*Primary Examiner* — Vladimir Magloire
*Assistant Examiner* — Kimberly Jenkins
(74) *Attorney, Agent, or Firm* — Jefferson IP Law, LLP

(57) ABSTRACT

The disclosure relates to a wide scanning antenna array. The technical result consists in increasing the beam scanning range of the antenna array and the operating frequency range, simplifying the design of the antenna array and reducing losses. An antenna array is provided. The antenna array includes a plurality of antenna array elements. Each antenna array element of the plurality of antenna array elements includes a main printed circuit board (PCB) over which a middle layer and an additional PCB are arranged. A first patch element is disposed at the main PCB, and a second patch element is disposed at the additional PCB. The antenna array element further includes a cavity in the middle layer to reduce coupling between the antenna array element and at least another antenna array element of the plurality of antenna array elements. The cavity in the middle layer includes a hole that supports coupling between the first patch element and the second patch element. The main PCB, the middle layer and the additional PCB are interconnected by means of a no galvanic connection.

16 Claims, 3 Drawing Sheets

(56) References Cited

U.S. PATENT DOCUMENTS

| | | | | |
|---|---|---|---|---|
| 2007/0080864 | A1 | 4/2007 | Channabasappa | |
| 2012/0262254 | A1 | 10/2012 | Dremelj et al. | |
| 2016/0248160 | A1 * | 8/2016 | Shtrom | H01Q 1/243 |
| 2017/0271780 | A1 * | 9/2017 | Shen | H01Q 9/0457 |
| 2018/0034156 | A1 | 2/2018 | Zhang et al. | |
| 2018/0083364 | A1 | 3/2018 | Foo | |
| 2018/0102594 | A1 * | 4/2018 | Murdock | H01Q 1/48 |
| 2018/0358677 | A1 | 12/2018 | Artemenko et al. | |
| 2019/0319369 | A1 * | 10/2019 | Chiang | H01Q 7/00 |
| 2019/0326674 | A1 | 10/2019 | Kang et al. | |
| 2019/0334232 | A1 | 10/2019 | Ha et al. | |
| 2020/0365996 | A1 * | 11/2020 | Roth | H01Q 13/18 |
| 2021/0151889 | A1 | 5/2021 | Han et al. | |
| 2022/0102835 | A1 * | 3/2022 | Makurin | H01Q 1/52 |
| 2022/0352636 | A1 * | 11/2022 | Yetisir | H04B 17/11 |

FOREIGN PATENT DOCUMENTS

| | | | | |
|---|---|---|---|---|
| CN | 109792106 | A | 5/2019 | |
| CN | 110676578 | A | 1/2020 | |
| CN | 113224520 | A | 8/2021 | |
| EP | 3793023 | A1 * | 3/2021 | H01Q 9/42 |
| RU | 2 600 506 | C1 | 10/2016 | |

OTHER PUBLICATIONS

Steyskal; On the Merit of Asymmetric Phased Array Elements; IEEE Transactions on Antennas and Propagation; vol. 61, No. 7; Jul. 1, 2013; Concord, MA.

Russian Office Action dated Jul. 19, 2022; Russian Appln. No. 2021132942/28(069273).

* cited by examiner

WIDE SCANNING PATCH ANTENNA ARRAY

CROSS-REFERENCE TO RELATED APPLICATION(S)

This application is a continuation application, claiming priority under § 365 (c), of an International application No. PCT/KR2022/017722, filed on Nov. 11, 2022, which is based on and claims the benefit of a Russian patent application number 2021132942, filed on Nov. 12, 2021, in the Russian Intellectual Property Office, the disclosure of which is incorporated by reference herein in its entirety.

FIELD OF THE INVENTION

The disclosure relates to radio engineering. More particularly, the disclosure relates to a wide scanning patch antenna array.

BACKGROUND

The constantly rising needs of users have motivated the rapid development of communication technologies. Currently, there is an active development of promising fifth generation (5G) and sixth generation (6G) communication networks, which will be characterized by higher performance indicators, such as high transmission speed and energy efficiency.

New applications require the introduction of a new class of radio systems capable of transmitting/receiving data/energy and having the ability to adaptively change the characteristics of the radiated electromagnetic field. An important component of such systems are controllable antenna arrays, which find their application in data transmission systems such as 5G (28 GHz), WiGig (60 GHz), Beyond 5G (60 GHz), 6G (subTHz), long-distance wireless power transmission (LWPT) (24 GHz) systems, automotive radar systems (24 GHz, 79 GHz), etc.

Millimeter-wave antenna arrays used in these fields shall meet several basic requirements, such as low losses and high gain, beam scanning in a wide range of angles, wide operating frequency range, and compact, cheap, repeatable hardware design applicable for mass production.

Nowadays, for production of millimeter-wave radiators, the technology of printed circuit boards (PCB) is widely used, since this technology makes it possible to obtain devices characterized by simplicity of design and manufacturability, ease of implementation in a single board with other electronic units, the ability to achieve a wide bandwidth of operating frequencies.

A patch antenna array is an array of patch antenna elements.

The existing millimeter-wave antenna technologies have a number of limitations that significantly affect their applicability, such as, small distance between antenna element feeding ports, surface wave propagation in antennas' PCBs, significant gain degradation at great scan angles, the need to adapt to antenna-in-package (AiP) technology, and extremely stringent requirements for manufacturing accuracy, etc.

When used in communication systems, the requirements for antenna arrays as part of base stations are providing full all-round (360 deg) beam scanning at azimuth and operation with double polarization. The full beam scanning is realized by means of combining a few antenna arrays with the finite scanning sector. Obviously, the number of arrays required for a base station is defined by the scanning scope of the individual arrays used. So, if antenna array scanning bound is restricted by ±45 degrees, which is typical for antenna arrays currently used in base stations, then 4 arrays are demanded to provide full all-round (360 deg) beam scanning. When the scanning bound is extended to ±60 degrees, only 3 arrays are required for the array. Thus, an increase in the scanning bound of an antenna array can lead to a decrease in the demanded number of antenna arrays to provide a given signal coverage and, accordingly, reduce the complexity of antenna system as a whole.

Antenna arrays have a number of fundamental limitations for their scanning capabilities. The scanning range $\theta_{max}$ is determined by the space between the antenna elements d and the appearance of a diffraction lobe at the upper operating frequency f of the device range:

$$f = \frac{c_0}{d \cdot |1 + \sin\theta_{max}|},$$

where $C_0$ is the speed of light. However, within this scanning range, there may be angles at which a blinding effect occurs at the antenna array, consisting in sharp gain degradation while scanning. This effect is associated with the propagation of parasitic surface waves between the array elements in the PCB substrate and their addition at the points where the feeding elements are located, which leads to a mismatch of the antenna elements or, in the case of dual-polarized arrays, power flow to the $2^{nd}$ polarization ports. The array blinding can occur at intermediate scanning angles, and can appear at angles close to $\theta_{max}$.

Dual-polarized antenna elements have an asymmetric structure, which can exacerbate these effects. At the design stage of antenna arrays, this also appears in the asymmetric radiation pattern of an individual antenna element in the entire array and the resulting asymmetry in the scanning characteristics.

The asymmetric structure of an element of a dual-polarized antenna array with feeding lines (ports) leads to the appearance of parasitic surface waves (PSW), and PSW propagation has a certain direction. Surface waves are summed in phase at the location of the second port. The result is a leakage of power to the second port. As a result, there is a significant gain degradation of the array element at a certain angle of radiation relative to the normal and a decrease in the operating frequency range.

This is illustrated as follows.

For an antenna array with radiation symmetry, the following equation should be true:

$$P_{radiation}(\theta)=P_{radiation}(-\theta) \quad \text{Equation 1}$$

where $P_{radiation}(\theta)$ is the radiation power of the antenna element at the scanning angle $\theta$.

It is worth considering that $$P_{radiation}=P_{in}-P_{reflection}-P_{leakage}-P_{loss} \quad \text{Equation 2}$$

where $P_{in}$ is the antenna element's input power, $P_{reflection}$ is reflected power at the input port, $P_{leakage}$ is the leakage power (to the second port), $P_{loss}$ is the power of loss in the dielectric of the PCB, conductors, etc.

Equation 1 is satisfied under the following conditions:

$P_{reflection}(\theta)=P_{reflection}(-\theta)$, $P_{leakage}\rightarrow 0$ or $P_{leakage}(\theta)=P_{leakage}(-\theta)$, $P_{loss}\rightarrow 0$.

The asymmetry of the antenna array radiation ($P_{radiation}(\theta)+P_{radiation}(-\theta)$), described above, is most often caused by the asymmetry of the leakage power ($P_{leakage}(\theta)\neq P_{leakage}$ ($-\theta$)). This occurs at high values of the coupling coefficient between ports. Thus, to ensure symmetry, measures shall be taken to reduce the leakage power ($P_{leakage}(\theta)\rightarrow 0$ and $P_{leakage}(-\theta)\rightarrow 0$). In this case, $P_{radiation}(\theta)=P_{radiation}(-\theta)$ is possible.

A solution is known from the related art as described in the article "Design of a Dual-Polarized Stacked Patch Antenna for Wide-Angle Scanning Reflectarrays" by T. Chaloun, V. Ziegler and W. Menzel (IEEE TRANSACTIONS ON ANTENNAS AND PROPAGATION, VOL. 64, NO. 8, August 2016). This article describes a dual-polarized stacked patch antenna element for wide-angle scanning at Ka-band. The proposed highly integrated multilayer element operates from 27.8 GHz to 30.8 GHz with excellent scan performance up to #60° in both E- and H-plane. This solution demonstrates high isolation between polarizations in the entire scanning range. However, the configuration described therein requires galvanic connection of the metal grid with the patch PCB layers.

The article "Surface waves minimization in Microstrip Patch Antenna using EBG substrate" (published in "2015 International Conference on Signal Processing and Communication (ICSC)") describes an antenna array with Electromagnetic Band Gap (EBG) (structure that forms an area with inhibited propagation of electromagnetic waves of a certain frequency range) surface with a resonant frequency lying in the band gap of the EBG substrate. An EBG element represents a small patch with shorting VIA (Plated Via) in the center. Two adjacent elements form a resonator, and their combination suppresses parasitic surface waves. However, additional space between elements is required for disposing of the EBG structure, while this space is restricted by maximum acceptable distance between elements. In addition, this solution operates only with one polarization.

The article "Meta-Surface Wall Suppression of Mutual Coupling between Microstrip Patch Antenna Arrays for THz-Band Applications" (PROGRESS IN ELECTROMAGNETICS RESEARCH LETTERS, VOL. 75, 105-111, 2018) describes an antenna array with a two dimensional (2D) meta-surface wall to increase the isolation between patch radiators. The meta-surface unit cell comprises conjoint "Y-shaped" microstrip structures which are interleaved together to create a meta-surface wall. This wall is inserted between the patches to reduce mutual coupling. Herewith the matching of antenna and radiation patterns are improved. However, additional space between the antenna array elements is required for placing the meta-surface elements. In addition, this solution operates only with one polarization.

The related art also describes a solution in the article "On the Merit of Asymmetric Phased Array Elements" (IEE TRANSACTIONS ON ANTENNAS AND PROPAGATION, VOL. 61, NO. 7, July 2013). This solution sets forth an antenna array with non-symmetrical patches. The patch design is obtained by numerical optimization using a genetic algorithm. The elements have with spoiled symmetry have better scan and/or bandwidth performance. However, for realization of optimal non-symmetrical structure the additional space is required. In addition, this solution operates only with one polarization.

Patent document U.S. Pat. No. 6,211,824 B1 describes an antenna array that uses multiple patch elements to control the direction of an antenna beam over a large scan volume. The antenna contains a first combined substrate, a plurality of first patch radiators arranged on a surface of the first substrate, and a plurality of second patch radiators arranged on a surface of the second substrate. The first substrate is formed from regions with alternated dielectric constant to effectively prevent surface wave propagation, thereby increasing the scan volume of the antenna. However, this solution is characterized by a very complicated technology producing because of existence of multiplex alternated regions with different permittivity and cannot be used to transmit signals in mm and sub mm bands. In addition, this solution operates only with one polarization.

In the article "A technique of scan blindness elimination for planar phased array antenna using miniaturized EBG" by M. S. M. Isa et. al. (Jurnal Teknologi, vol. 69, pp. 11-15, March 2014) describes a 5×3 antenna array. In this array, to increase the scanning range, a miniaturized capacitive loaded EBG structure has been inserted between the antenna elements. However, additional space between the elements is required for disposing of the EBG structure. In addition, this solution operates only with one polarization.

Thus, there is a need in the art for a simple and cheap wide beam scanning antenna structure operating over a wide frequency range, having low loss, compact size, and high gain.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna with a simple configuration, low loss, compact size, high gain, capable of focusing/scanning a beam in a wide range of scanning angles, operating in a wide frequency range.

Additional aspects will be set forth in part in the description which follows and, in part, will be apparent from the description, or may be learned by practice of the presented embodiments.

In accordance with an aspect of the disclosure, an antenna array is provided. The antenna array includes a plurality of antenna array elements. Each antenna array element of the plurality of antenna array elements includes a main printed circuit board (PCB) over which a middle layer and an additional PCB are arranged. A first patch element is disposed at the main PCB, and a second patch element is disposed at the additional PCB. The antenna array element further includes a cavity in the middle layer to reduce coupling between the antenna array element and at least another antenna array element of the plurality of antenna array elements. The cavity in the middle layer includes a hole that supports coupling between the first patch element and the second patch element. The main PCB, the middle layer and the additional PCB are interconnected by means of a non-galvanic connection.

According to another embodiment, the antenna array element further includes at least one of a cavity in the main PCB or a cavity in the additional PCB, wherein the cavity in the main PCB is defined by a plurality of first plated through VIAs surrounding the first patch element, and the cavity in the additional PCB is defined by a plurality of second plated VIAs surrounding the second patch element, and wherein the cavity in the middle layer, together with at least one of the cavity in the additional PCB or the cavity in the main PCB, form a complex cavity to reduce the coupling between the antenna array element and at least the other antenna array element of the plurality of antenna array elements.

According to another embodiment, the first plated VIAs defining the cavity in the main PCB, and the second plated VIAs defining the cavity in the additional PCB, are spaced apart, wherein a distance between edges of the first plated VIAs, and a distance between edges of the second plated VIAs, is less than $\lambda_{diel}/2$, where $\lambda_{diel}$ is an operating wavelength.

In another embodiment, the cavity in the middle layer, together with at least one of the cavity in the additional PCB or the cavity in the main PCB, which form the complex cavity are of a same shape.

In another embodiment, the first patch element and at least one feeding port in the main PCB are rotated relative to peripheral sides of the antenna array element by 45 degrees around normal to a plane of the antenna array element.

In another embodiment, the second patch element is positioned in a same position as the first patch element.

In another embodiment, the first patch element and the second patch element both have a shape that is symmetrical relative to polarization planes.

In another embodiment, the middle layer is formed of metal in which the hole is formed therethrough and walls of the hole at least partly define the cavity in the middle layer.

According to another embodiment, the middle layer is a PCB in which the hole is surrounded by a plurality of VIAs at least partly defining the cavity in the middle layer.

In another embodiment, the hole is formed through the middle layer.

According to another embodiment, the main PCB and the PCB of the middle layer are a single PCB, and the hole of the middle layer is formed at a certain depth in the single PCB.

According to another embodiment, the additional PCB and the PCB of the middle layer are a single PCB, and the hole of the middle layer is formed at a certain depth in the single PCB.

According to another embodiment, at least one of a gap between the main PCB and the middle layer, or a gap between the middle layer and the additional PCB, are filled with a dielectric layer or are an air gap, a height of each gap being no more than 50 μm.

In another embodiment, the antenna array is a dual polarized antenna array.

In another embodiment, the antenna array is a single polarized antenna array.

In another embodiment, the hole of the middle layer is an air hole.

In another embodiment, the first patch element is electrically connected to at least one feeding port, and the second patch element is electromagnetically coupled to the first patch element.

The disclosure provides an antenna with a simple configuration, low loss, compact size, high gain, capable of focusing/scanning a beam in a wide range of scanning angles, operating in a wide frequency range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In accordance with an embodiment, the disclosure describes is an antenna array, wherein each element of the antenna array comprises a main printed circuit board (PCB), an additional PCB and a middle layer placed between them. The antenna array element may have a square shape.

Figure 1:
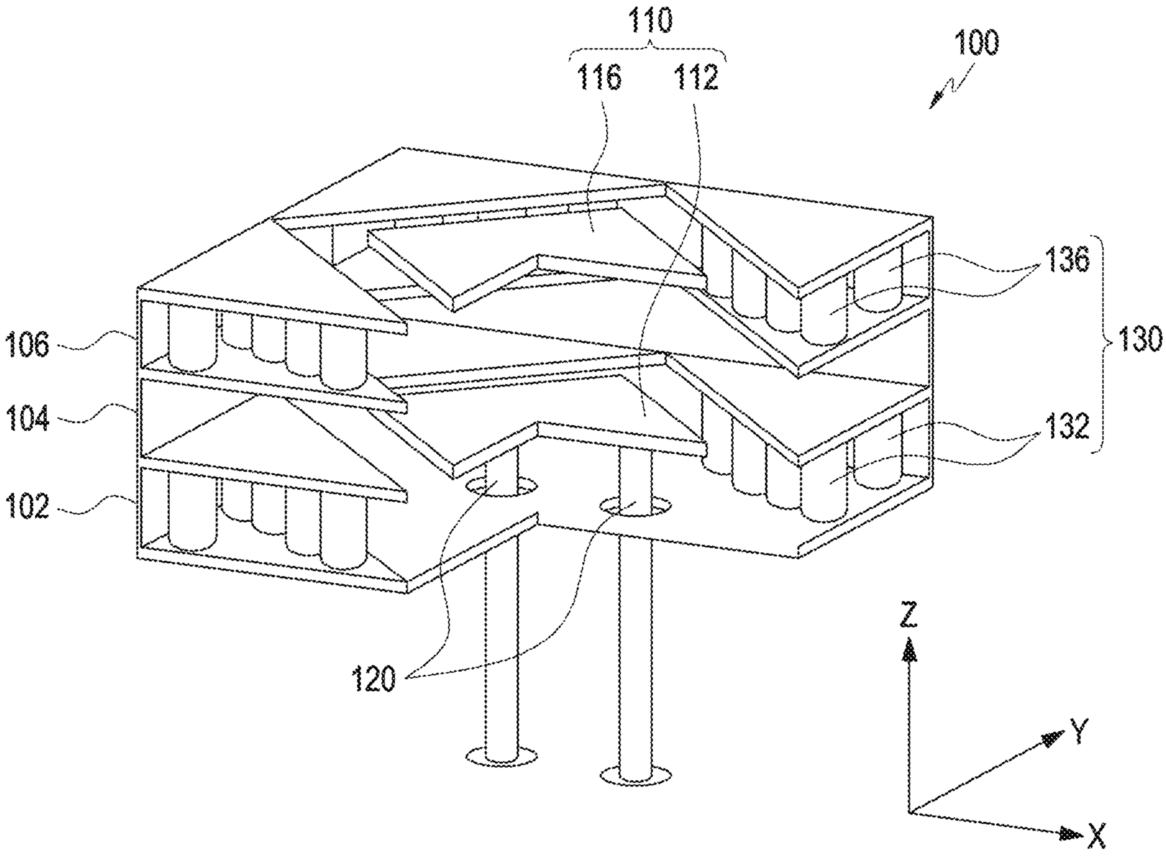
FIG. 1 shows a general view of a quarter-cut antenna array element according to an embodiment of the disclosure.

FIG. 1 shows a general view of a quarter-cut antenna array element according to an embodiment of the disclosure.

Referring to FIG. 1, antenna array element 100 may include layers that are arranged from bottom to top in the following order: main PCB 102, middle layer 104, additional PCB 106. The antenna array element 100 may include patch elements 110 including patch element 112 and patch element 116. Patch element 112 may be located on the top surface of the main PCB 102. Likewise, patch element 116 may be located on the top surface of the additional PCB 106. The patch element 112 of the main PCB 102 and the patch element 116 of the additional PCB 106 may have a square shape. The patch element 112 of the main PCB 102 may be fed by feeding ports 120. The antenna array element 100 may include plated-through VIAs 130 including first plated VIAs 132 and second plated VIAs 136. The patch element 112 of the main PCB 102 may be surrounded by first plated VIAs 132 located at a distance from each other, wherein the distance between the edges of the first plated VIAs 132 shall be less than $\lambda_{diel}/2$, where $\lambda_{diel}$ is the operating wavelength in the main PCB 102. Similarly, the patch element 116 of the additional PCB 106 may be surrounded by second plated VIAs 136 located at a distance from each other, wherein the distance between the edges of the second plated VIAs 136 shall be less than $\lambda_{diel}/2$, where $\lambda_{diel}$ is the operating wavelength in the additional PCB 106.

Figure 2:
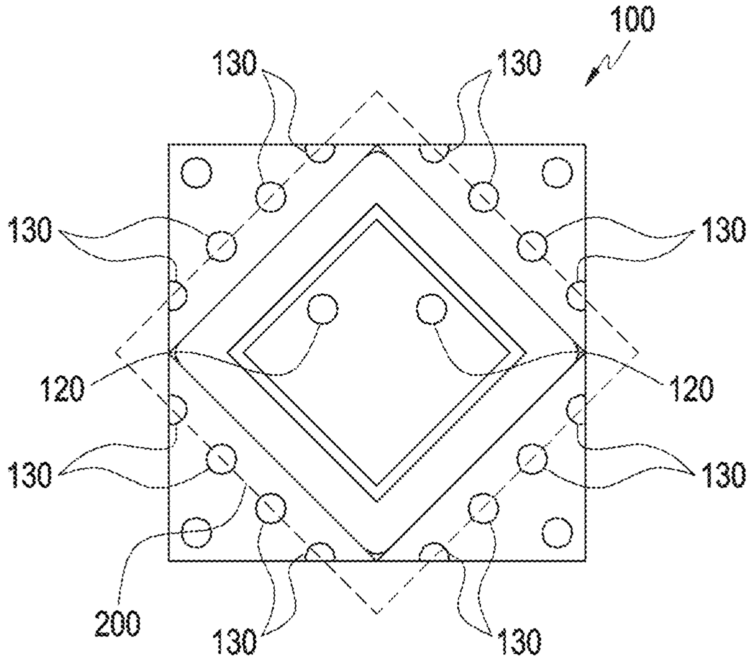
FIG. 2 is a top view of one element of an antenna array according to an embodiment of the disclosure.

FIG. 2 is a top view of one element of an antenna array according to an embodiment of the disclosure.

Referring to FIG. 2, VIAs 130 of an antenna array element 100 may form reflective "walls" 200 that define a cavity in the given PCB and may prevent propagation of surface waves in the antenna array element 100. The antenna array element 100 may include a complex cavity consisting of cavities in the main PCB 102 and the additional PCB 106, as well as cavities in the middle layer located between the main PCB 102 and the additional PCB 106. The interior of the cavity surrounded by the first plated VIAs 132 in the main PCB 102 and the second plated VIAs 136 in the additional PCB 106 may be filled with a PCB dielectric. The main PCB 102, the middle layer 104, and the additional PCB 106 may be interconnected by no galvanic connection.

Thus, the patch element 112 of the main PCB 102 and the patch element 116 of the additional PCB patch, in an embodiment, may be located above a cavity in the corresponding PCB, wherein the cavities are defined by reflective "walls" 200 formed by a plurality of plated VIAs 130 (i.e., first plated VIAs 132 and second plated 136).

In an embodiment, the shape of the cavity in the middle layer 104 may be substantially identical to the shape of the cavities in the main PCB 102 and the additional PCB 106. However, in alternative embodiments, the dimensions of the cavities in in or more of the main PCB 102, the middle layer 104, or the additional PCB 106 may be different from each other.

In the embodiment described above, the patch elements 110 are in the shape of a square, although such patch elements 110 can have any shape with symmetry about the polarization planes. For example, in the case of dual polarization, the patch elements 110 may be symmetrical relative to both planes.

Next, referring to FIGS. 1 through 3, an embodiment of the disclosure will be described in more detail.

Figure 3:
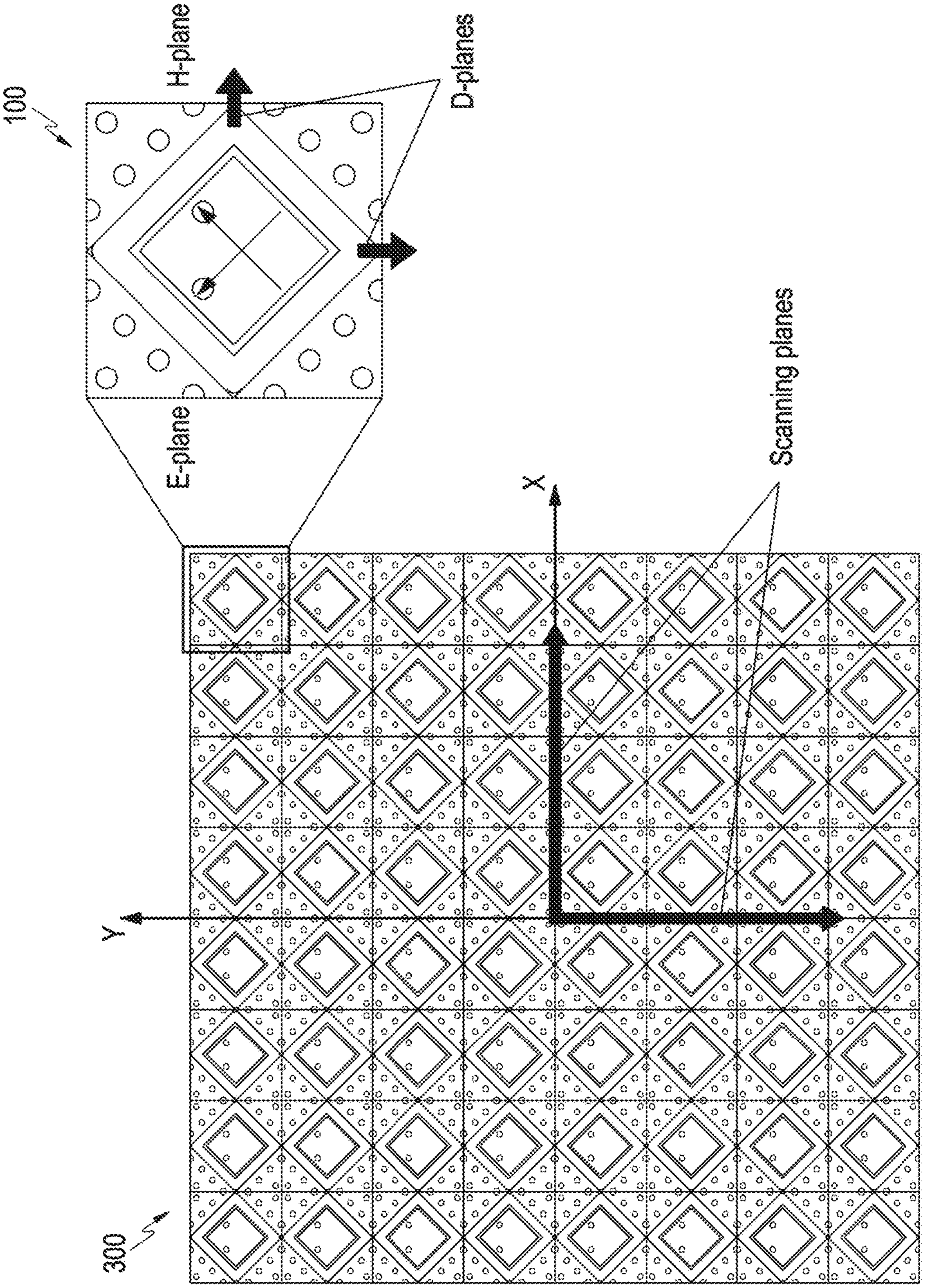
FIG. 3 is a top view of an antenna array and one antenna array element with indication of scanning planes according to an embodiment of the disclosure.

FIG. 3 is a top view of an antenna array and one antenna array element with indication of scanning planes according to an embodiment of the disclosure, The patch element 112 of the main PCB 102 may be excited by at least one feeding port 120, which may set the polarization of a radiated signal. In the case of a single polarized antenna array 300, the patch element 112 is excited by one feeding port 120, and in the case of a dual polarized antenna array 300, by two feeding ports 120, wherein the polarizations excited by each of the feeding ports 120 are perpendicular.

In general, due to the wider H-plane radiation pattern, the antenna array 300 has a wider H-plane scan range) (<55° than the E-plane scan range) (<45°. As a consequence, a double polarization antenna array 300 has different scanning characteristics in the E- and H-planes.

Referring to FIG. 3, in the disclosure, the antenna array element 100 and feeding port(s) 120 may be rotated with respect to the sides of the antenna array 300 elements by 45 degrees around the normal to the plane of the antenna array element 100. As a result, scanning of the antenna array 300 may be performed in the D-plane of the antenna array element 100, in which the shape of the radiation pattern of the antenna array element 100 is essentially the same for both polarizations as an intermediate section of the element pattern.

The antenna array element 100 may have, as a rule, different radiation patterns in the E- and H-planes, i.e., rotation-free positioning of the element will give different radiation patterns for each of the feeding ports 120. In the D-plane, the directional patterns of different feeding ports 120, for the mentioned case, are mirror-symmetric (D1(ε) =D2 (−ε)) and are close to symmetric in the case of low power leakage between the feeding ports 120 over the entire scanning range. As a consequence, when developing an antenna array element 100 and an antenna array 300, it may be sufficient to optimize its geometry in one plane (in the second plane, the simulation results, due to the symmetry of the radiation characteristics in the D-plane, will be the same). This also simplifies the array control as it will be possible to apply the same phase distribution to the antenna array elements 100 for scanning in both polarizations.

The patch element 116 of the additional PCB 106 may be positioned similarly to the patch element 112 of the main PCB 102 and is excited by an electromagnetic radiation (signal) from the patch element 112 of the of the main PCB 102.

The corners of the square patch elements 110 may be rounded to make it compact.

In general, the cavity in the middle layer 104 includes an air hole supporting the coupling of the patch element 112 in the main PCB 102 with the patch element 116 in the additional PCB 106. The middle layer 104 between the main PCB 102 and the additional PCB 106 in an embodiment may be a metal layer. In such a metallic middle layer 104, the cavity is formed as a through hole, i.e. the walls of the hole form the walls of the cavity in the middle layer 104. The hole may be filled with air.

One of the reasons for the asymmetry of radiation of the antenna array 300 is the leakage of the radiated power due to propagation of surface waves in the substrates of the main PCB 102 and the additional PCB 106 of the antenna array element 100. The complex cavity, consisting of the cavities of the main PCB 102 and the additional PCB 106, as well as the cavity in the metal middle layer 104, prevents propagation of surface waves, which effectively reduces the coupling between the antenna array elements 100 and reduces the power loss during scanning. The cavity in the metal middle layer 104 may be a through-hole that supports coupling between the patch element 112 in the main PCB 102 and the patch element 116 in the additional PCB 106. Reducing the coupling between the antenna array elements 100 of the antenna array 300 addresses the problem of array blindness: to reduce the power loss as a result of the mismatch of the antenna array elements 100 of the main operating polarization and the coupling with the second polarization of the antenna array element 100. In accordance with Equation 1, this makes it possible to provide symmetric scanning characteristics of the antenna array 300 in a wide range of angles.

Such a structure for the antenna array 300 provides a symmetric radiation pattern of a single antenna array element 100 in the antenna array 300, as well as achieving array gain losses of less than 3 dB even in extreme scanning positions in the range of ±60 degrees.

It should be noted that the shape of the cavity in the middle layer 104 in the embodiment shown in FIGS. 1 through 3 is identical to the shape of the cavities in the main PCB 103 and the additional PCB 106, i.e., a square shape. In alternative embodiments, the cavity in the middle layer 104 may be a rectangular hole, a rectangular hole with rounded corners, a circular hole, etc.

The middle layer 104 in an embodiment is in the form of a metal layer. Alternatively, the middle layer can be based on a PCB (or part of another PCB). In such a case, the hole in the middle layer 104 is surrounded by a plurality of plated VIAs 130 (not shown) forming the "walls" 200 that define the cavity in the middle layer 104.

The walls 200 of the complex cavity or portions of the complex cavity in various embodiments may be parallel to the edges of the patch element 112 in the main PCB 102 and the patch element 116 in the additional PCB 106, or may be parallel to the walls 200 of the antenna array element 100.

An embodiment is possible in which the antenna array element 100 includes a cavity in the middle layer 104, while there is no cavity in the main PCB 102 and/or additional PCB 106. Otherwise, the structure of the antenna array element 100 in this embodiment may be the same as the embodiment described above. This embodiment has a simpler design and is effective for suppressing surface waves. That is, in such an embodiment, the cavity of the middle layer 104 significantly reduces propagation of surface waves in the antenna array 300. At the same time, for certain parameters (e.g., thickness and dielectric constant) of the dielectric of the main PCB 102 and the additional PCB 106, cavities in the main PCB 103 and/or the additional PCB 106 can significantly improve the characteristics of the antenna array 300.

The main PCB 102, the middle layer 104, and the additional PCB 106 do not require a galvanic connection to transmit a signal. The mentioned parts of the antenna array element 100 can simply be fixed relative to each other with gaps between them. Said gaps can be formed naturally as a result of imperfect surfaces of the antenna array element 100 parts, or they can be specially designed to provide a fixed distance between the antenna array element 100 parts. The gaps can be filled with a dielectric (e.g., Teflon film) or can be an air gap provided by spacers. The height of the gap between said layers should not exceed 50 μm. In this case, the gap does not adversely affect the characteristics of the antenna array 300.

Connection of said layers without the need to provide a galvanic connection greatly facilitates the assembly of the antenna array element 100, and by extension, the antenna array 300.

Providing the middle layer 104 and the additional PCB 106 to the main PCB 102 of the antenna array element 100 improves the scanning performance of the antenna array 300 and expands the operating bandwidth.

The following describes the operation of an antenna array 300 in accordance with an embodiment of the disclosure.

A high-frequency signal from the generator is fed to the operating polarization port of the antenna array element 100. The input signal is characterized by amplitude and phase. In the general case, the amplitude of the signals at all antenna array elements 100 of the antenna array 300 should be the same. The phase of the signal determines the position of the antenna beam in space.

The signal is fed through the feeding ports 120 to the patch element 112 located on the main PCB 102. The size and shape of the patch element 112 are resonant to the applied frequency signal. The patch element 112 on the main PCB 102 is electromagnetically coupled to the patch element 116 located on the additional PCB 106. The patch element 112 on the main PCB 102 may not be electrically connected to the patch element 116 located on the additional PCB 106. The additional PCB 106 is located at some distance from the main PCB 102. This distance is fixed using a middle layer, which may be metal, located between the main PCB 102 and the additional PCB 106, with an air hole made in it, which supports coupling of the patch element 112 of the main PCB 102 and the patch element 116 of the additional PCB 106. The size and shape of the patch element 116 of the additional PCB 106 is resonant to the applied frequency signal.

The electromagnetic field, excited by each composite antenna array element 100 of the antenna array 300, is added in the far zone of the array, as a result of which, with a certain phase distribution of the signals supplied to the antenna array elements 100, the radiation of the antenna array 300 becomes directional and the formation of the antenna beam occurs. By controlling the phase of the supplied signal, the position of the beam in space is controlled and antenna scanning is carried out. The previously described cavities around each of the patch elements 110 help to reduce coupling between adjacent antenna array elements 100 of the antenna array 300, which in turn improves the scanning capabilities.

Due to the weak coupling (<−10 dB) between the polarizations of the antenna array element 100, a signal from the generator can be applied to the feeding ports 120 of both polarizations of the antenna array element 100 both alternately and simultaneously.

In an alternative embodiment, the main PCB 102 and the middle layer 104 can be formed as a single PCB connected to the additional PCB 106 via (or without) an air gap. In this case, the cavity of the middle layer 104 includes a hole at a certain depth. Likewise, the additional PCB 106 and the middle layer 104 can be formed as a single PCB connected to the main PCB 102 via (or without) an air gap. Such an embodiment reduces the complexity of manufacturing the antenna array 300.

Thus, the disclosure makes it possible to expand the scanning range of the antenna array 300, increase its efficiency and reduce losses. The antenna array 300 according to the disclosure has a compact size and a simple and inexpensive configuration suitable for mass production.

The antenna array 300 of the disclosure is designed for use in the millimeter wavelength range. However, this configuration can be used in the design of antenna arrays 300 and other ranges, for example, centimeter, submillimeter (terahertz frequency range), etc.

The compact and highly efficient systems employing steerable antenna array 300 in accordance with the disclosure can find application in wireless communication systems of the promising 5G, 6G and WiGig standards. Moreover, the disclosure can be used both in base stations and in antennas of mobile terminals. The user terminal antennas are steered to point to the base station antenna position.

The disclosure can find application in all types of systems (e.g., long-distance wireless power transmission (LWPT) systems): outdoor/indoor, automotive, mobile, etc. This ensures high efficiency of power transmission in all scenarios. The power transmission device can be built on the basis of the described structure of the antenna array 300 and thus can implement beam focusing when charging devices in the near field or scanning the beam for transmitting power to devices located in the far zone of the transmitter antenna.

When used in robotics, the proposed antenna can be used to detect/avoid obstacles.

The disclosure can also be used in autonomous vehicle radars.

It should be understood that although terms such as "first", "second", "third" and the like may be used herein to describe various elements, components, regions, layers and/or sections, these elements, components, areas, layers and/or sections should not be limited by these terms. These terms are used only to distinguish one element, component, region, layer or section from another element, component, region, layer or section. Thus, the first element, component, region, layer or section may be called a second element, component, region, layer or section without departing from the scope of the disclosure. As used herein, the term "and/or" includes any and all combinations of one or more of the respective listed positions. Elements mentioned in the singular do not exclude the plurality of elements, unless otherwise specified.

The functionality of an element specified in the description or claims as a single element can be implemented in practice by several components of the device, and vice versa, the functionality of elements specified in the description or in the claims as several separate elements can be implemented in practice by a single component.

The embodiments of the disclosure are not limited to the embodiments described herein. Basing on the information set forth in the description and knowledge of the prior art, those skilled in the art will appreciate other embodiments of the disclosure which are not apart from the essence and scope of this disclosure.

Elements mentioned in the singular do not exclude the plurality of elements, unless otherwise specified.

A person skilled in the art should understand that the essence of the disclosure is not limited to a specific software or hardware implementation, and therefore any software and hardware known in the prior art can be used to implement the disclosure. So hardware can be implemented in one or more specialized integrated circuits, digital signal processors, digital signal processing devices, programmable logic devices, user-programmable gate arrays, processors, controllers, microcontrollers, microprocessors, electronic devices, other electronic modules capable of performing the functions described in this document, a computer, or a combination of the above.

The features mentioned in various dependent claims, as well as the embodiments disclosed in various parts of the description, can be combined to achieve advantageous effects, even if the possibility of such combination is not explicitly disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna array comprising:

a plurality of antenna array elements, each antenna array element of the plurality of antenna array elements including:

a main printed circuit board (PCB) over which a middle layer and an additional PCB are arranged, wherein a first patch element is disposed at the main PCB, and a second patch element is disposed at the additional PCB, wherein the antenna array element further includes a cavity in the middle layer to reduce coupling between the antenna array element and at least another antenna array element of the plurality of antenna array elements, wherein the antenna array element further includes at least one of a cavity in the main PCB or a cavity in the additional PCB, wherein the cavity in the main PCB is defined by a plurality of first plated through VIAs surrounding the first patch element, and the cavity in the additional PCB is defined by a plurality of second plated VIAs surrounding the second patch element, wherein the cavity in the middle layer, together with at least one of the cavity in the additional PCB or the cavity in the main PCB, form a complex cavity to reduce the coupling between the antenna array element and at least the other antenna array element of the plurality of antenna array elements, and wherein the main PCB, the middle layer, and the additional PCB are interconnected by means of a non-galvanic connection.

2. The antenna array according to claim 1, wherein the first plated VIAs defining the cavity in the main PCB, and the second plated VIAs defining the cavity in the additional PCB, are spaced apart, and wherein a distance between edges of the first plated VIAs, and a distance between edges of the second plated VIAs, is less than diel $\lambda_{diel}/2$, where $\lambda_{diel}$ is an operating wavelength.

3. The antenna array according to claim 1, wherein the cavity in the middle layer, together with at least one of the cavity in the additional PCB or the cavity in the main PCB, which form the complex cavity are of a same shape.

4. The antenna array according to claim 1, wherein the first patch element and at least one feeding port in the main PCB are rotated relative to peripheral sides of the antenna array element by 45 degrees normal to a plane of the antenna array element.

5. The antenna array according to claim 4, wherein the second patch element is positioned in a same position as the first patch element.

6. The antenna array according to claim 1, wherein the first patch element and the second patch element both have a shape that is symmetrical relative to polarization planes.

7. The antenna array according to claim 1, wherein the cavity in the middle layer includes a hole that supports coupling between the first patch element and the second patch element, and wherein the middle layer is formed of metal in which the hole is formed therethrough and walls of the hole at least partly define the cavity in the middle layer.

8. The antenna array according to claim 7, wherein the middle layer is a PCB in which the hole is surrounded by a plurality of VIAs at least partly defining the cavity in the middle layer.

9. The antenna array according to claim 8, wherein the hole is formed through the middle layer.

10. The antenna array according to claim 8, wherein the main PCB and the PCB of the middle layer are a single PCB, and wherein the hole of the middle layer is formed at a certain depth in the single PCB.

11. The antenna array according to claim 8, wherein the additional PCB and the PCB of the middle layer are a single PCB, and wherein the hole of the middle layer is formed at a certain depth in the single PCB.

12. The antenna array according to claim 1, wherein at least one of a gap between the main PCB and the middle layer, or a gap between the middle layer and the additional PCB, are filled with a dielectric layer or are an air gap, a height of each gap being no more than 50 μm.

13. The antenna array according to claim 1, wherein the antenna array is a dual polarized antenna array.

14. The antenna array according to claim 1, wherein the antenna array is a single polarized antenna array.

15. The antenna array according to claim 7, wherein the hole of the middle layer is an air hole.

16. The antenna array according to claim 1, wherein the first patch element is electrically connected to at least one feeding port, and wherein the second patch element is electromagnetically coupled to the first patch element.

* * * * *